(12) United States Patent
Irving

(10) Patent No.: US 6,871,300 B1
(45) Date of Patent: Mar. 22, 2005

(54) EMBEDDED SERVER CHASSIS HARDWARE MASTER SYSTEM AND METHOD

(75) Inventor: Guy B. Irving, The Woodlands, TX (US)

(73) Assignee: RLX Technologies, Inc., The Woodlands, TX (US)

( * ) Notice: Subject to any disclaimer, the term of this patent is extended or adjusted under 35 U.S.C. 154(b) by 538 days.

(21) Appl. No.: 09/848,807

(22) Filed: May 4, 2001

(51) Int. Cl.$^7$ .............................................. G06F 11/30
(52) U.S. Cl. ............................. 714/47; 714/4; 714/9; 709/208; 709/209
(58) Field of Search ............................. 714/9, 23, 47, 714/4, 48; 709/208, 209

(56) References Cited

U.S. PATENT DOCUMENTS

| | | | |
|---|---|---|---|
| 4,500,821 A | 2/1985 | Bitting et al. ............... 318/254 |
| 4,817,865 A | 4/1989 | Wray ........................ 236/49.5 |
| 4,964,065 A | 10/1990 | Hicks et al. ................ 364/514 |
| 5,408,616 A | 4/1995 | Murr .......................... 395/325 |
| 5,428,752 A | 6/1995 | Goren et al. ................ 395/325 |
| 5,513,361 A | 4/1996 | Young ......................... 395/750 |
| 5,546,272 A | 8/1996 | Moss et al. .................. 361/687 |
| 5,666,485 A | * 9/1997 | Suresh et al. ................. 714/48 |
| 5,687,079 A | 11/1997 | Bauer et al. ................. 364/175 |
| 5,727,928 A | 3/1998 | Brown ..................... 417/44.11 |
| 5,731,954 A | 3/1998 | Cheon ........................ 361/699 |
| 5,805,403 A | 9/1998 | Chemla ....................... 361/103 |
| 5,848,282 A | 12/1998 | Kang .................... 395/750.05 |
| 5,907,689 A | 5/1999 | Tavallaei et al. ............ 395/290 |
| 5,987,549 A | 11/1999 | Hagersten et al. .......... 710/107 |
| 6,037,732 A | 3/2000 | Alfano et al. ............... 318/471 |
| 6,065,081 A | 5/2000 | Stancil et al. ............... 710/104 |
| 6,101,459 A | 8/2000 | Tavallaei et al. ............ 702/132 |
| 6,145,098 A | * 11/2000 | Nouri et al. .................. 714/31 |
| 6,147,465 A | 11/2000 | Hollenbeck ................ 318/254 |
| 6,172,611 B1 | 1/2001 | Hussain et al. ............. 340/584 |
| 6,204,623 B1 | 3/2001 | Levy et al. .................. 318/641 |
| 6,257,832 B1 | 7/2001 | Lyszkowski et al. .......... 417/2 |
| 6,298,376 B1 | * 10/2001 | Rosner et al. .............. 709/209 |
| 6,321,175 B1 | 11/2001 | Nagaraj ...................... 702/132 |
| 6,324,571 B1 | * 11/2001 | Hacherl ...................... 709/208 |
| 6,325,636 B1 | 12/2001 | Hipp et al. ................... 439/61 |
| 6,392,372 B1 | 5/2002 | Mays, II ..................... 318/254 |
| 6,396,688 B1 | 5/2002 | Davies et al. ............... 361/687 |
| 6,411,506 B1 | * 6/2002 | Hipp et al. .................. 361/686 |
| 6,459,589 B2 | * 10/2002 | Manweiler et al. ......... 361/752 |
| 6,470,289 B1 | 10/2002 | Peters et al. ................ 702/132 |
| 6,591,324 B1 | 7/2003 | Chen et al. ................. 710/302 |
| 2002/0020755 A1 | 2/2002 | Matsushita ................ 236/49.3 |

OTHER PUBLICATIONS

Irving et al., U.S. Appl. No. 09/848,999 Entitled: "*System and Method for Controlling Server Chassis Cooling Fans*", filed May 4, 2001.

Co–pending patent application entitled "Server Chassis Hardware Master System and Method" by Irving, Guy B., U.S. Appl. No. 09/848,816 filed May 4, 2001.

* cited by examiner

*Primary Examiner*—Robert Beausoliel
*Assistant Examiner*—Joseph D Manoskey
(74) *Attorney, Agent, or Firm*—Baker Botts L.L.P.

(57) ABSTRACT

A system and method for monitoring a plurality of server processing cards of a server chassis includes selecting at least one hardware master from among a plurality of server processing cards. A hardware master control signal may be transmitted to the hardware master. A master control module coupled with the hardware master may be activated in response to the master control signal. In accordance with a particular embodiment of the present invention, the hardware master may be operable to at least partially monitor operating information regarding at least a subset of the plurality of server processing cards. The operating information may include health and/or configuration data associated with the subset of the plurality of server processing cards.

27 Claims, 7 Drawing Sheets

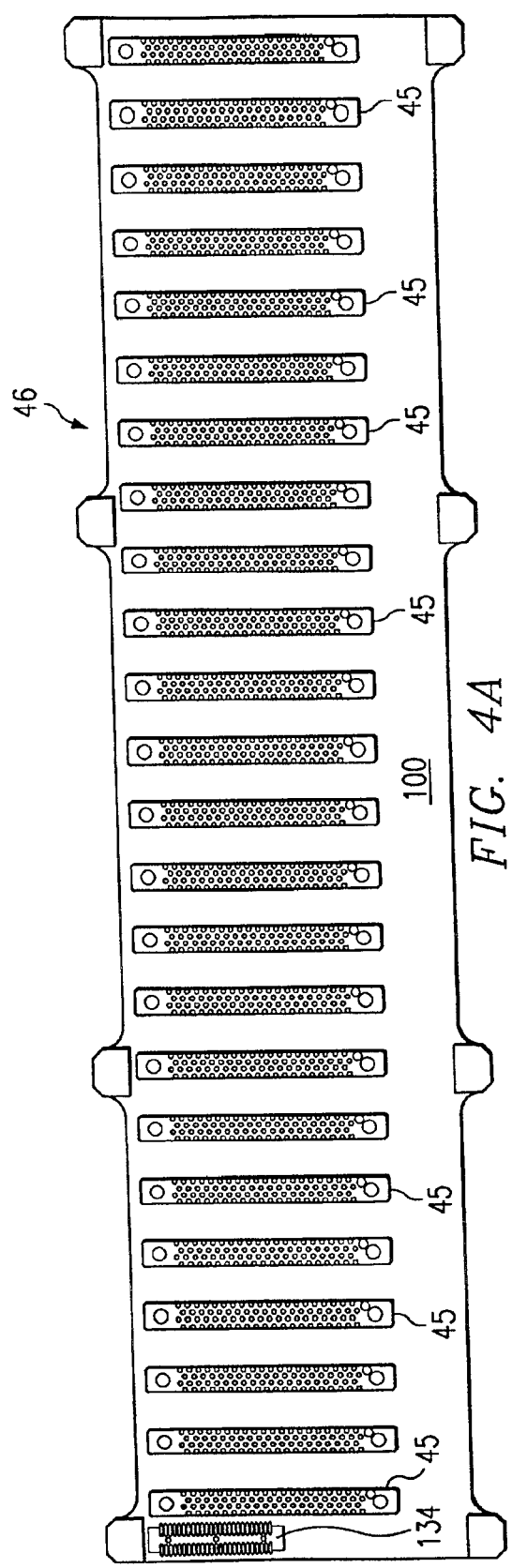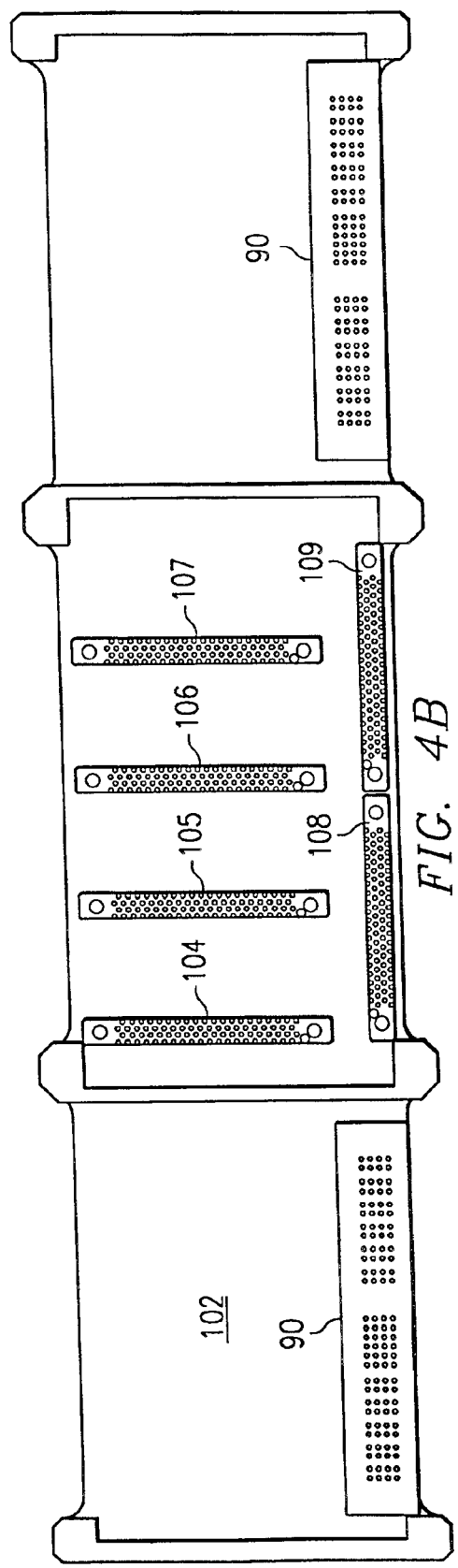
FIG. 4A
FIG. 4B

EMBEDDED SERVER CHASSIS HARDWARE MASTER SYSTEM AND METHOD

RELATED APPLICATIONS

This application is related to United States patent application entitled "Server Chassis Hardware Master System and Method" filed on May 4, 2001 under Ser. No. 09/848,816.

TECHNICAL FIELD OF THE INVENTION

The present invention relates generally to server chassis communication systems and more particularly, to a chassis hardware master embedded in one or more of a plurality of servers.

BACKGROUND OF THE INVENTION

Network servers are often used for storage of information, communication, and/or to provide access to communication networks including the Internet. Users of network servers are provided the ability to view, access, retrieve and/or store audio, video, data graphics and/or text files. Such files may be displayed to the user via protocols, including, without limitation, hypertext transfer protocol (HTTP). Network servers may include one or more server processing cards coupled with a server chassis. Each server processing card may include software and/or hardware components necessary to perform the functionality of a server.

SUMMARY OF THE INVENTION

The present invention provides a system and method for at least partially monitoring and/or controlling the operation of a plurality of server processing cards. More specifically, a hardware master is selected to at least partially monitor and/or control the operation of the plurality of server processing cards. In accordance with a particular embodiment of the present invention, one or more server processing cards include a module suitable to accomplish monitoring and/or control functionality. If a particular server is selected to assume hardware master responsibilities for one or more additional server processing cards, then the module activates and assumes such responsibilities. The module associated with each server processing card which is not selected to assume hardware master responsibilities remains idle, unless it is selected at a later time.

According to one aspect of the present invention, a method for monitoring a plurality of server processing cards of a server chassis includes selecting at least one hardware master from among a plurality of server processing cards. A hardware master control signal may be transmitted to the hardware master. A hardware master module coupled with the hardware master may activate in response to the master control signal. The hardware master may be operable to monitor operating information regarding at least a subset of the plurality of server processing cards. In particular embodiments, the operating information may include health and/or configuration data associated with the subset of the plurality of server processing cards.

According to another aspect of the present invention, the hardware master may be operable to control the operation of the subset of the plurality of server processing cards. The control may include transmitting, from the hardware master, a command to at least one of the subset of the plurality of server processing cards operable to cause the at least one of the subset to reboot. In a particular embodiment, the hardware master may transmit to at least one of the subset of the plurality of server processing cards a command operable to cause the at least one of the subset to reboot from an operating system resident upon a remote module of a local area network.

Technical advantages of particular embodiments of the present invention include a plurality of server processing cards each including a module operable to assume hardware master responsibilities with regard to one or more additional server processing cards. Accordingly, a hardware master may be selected from one of a plurality of server processing cards. Furthermore, a backup hardware master may be selected to assume hardware master responsibilities in the event of a failure of the previous hardware master.

Another technical advantage of a particular embodiment of the present invention includes a plurality of server processing cards including the ability to share hardware master responsibilities. A redundant configuration of hardware masters may be provided to limit the impact of a failed server processing card on overall hardware master responsibilities. Additionally, two or more server processing cards may divide hardware master responsibilities amongst themselves, in order to limit the load and/or responsibility of any particular server processing card.

Other technical advantages of the present invention will be readily available to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 4A is a schematic drawing, with portions broken away, illustrating the front view of a midplane, in accordance with a particular embodiment of the present invention;

FIG. 4B is a schematic drawing, with portions broken away, illustrating a rear view of the midplane of FIG. 4A;

DETAILED DESCRIPTION OF THE INVENTION

Figure 1:
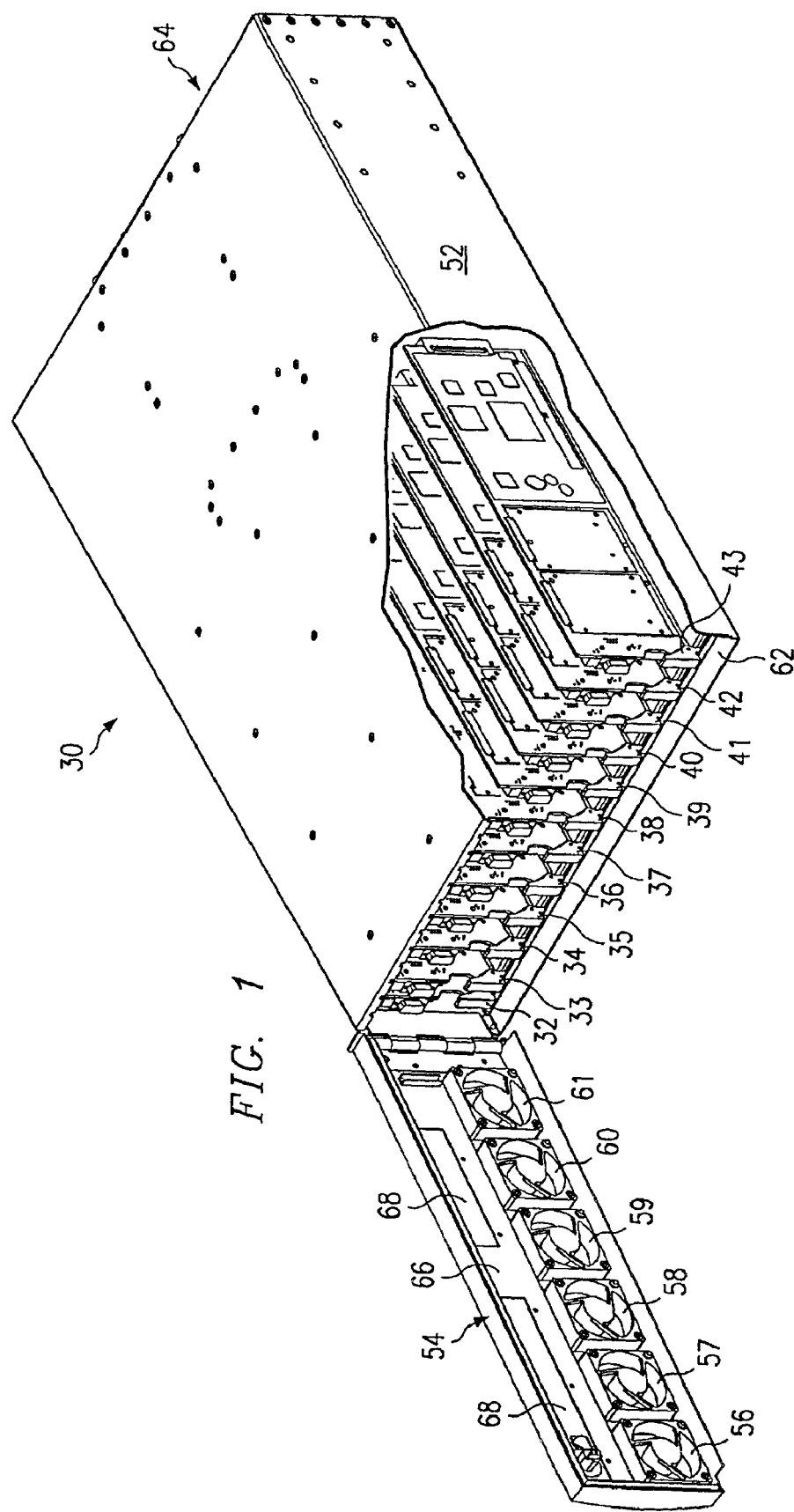
FIG. 1 is an isometric view, with portions broken away, illustrating a server chassis in accordance with a particular embodiment of the present invention.
Figure 2:
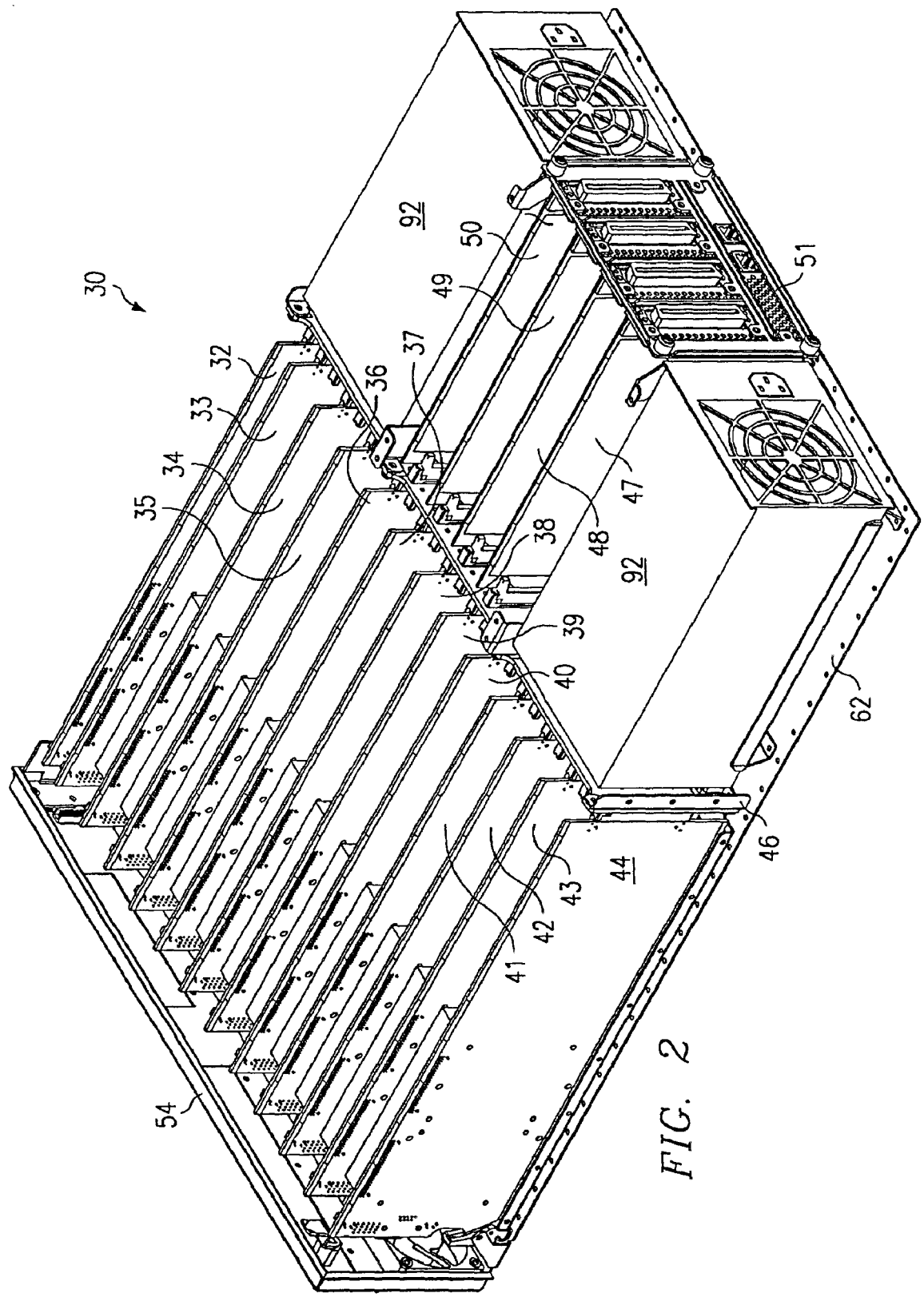
FIG. 2 is an isometric view, with portions broken away, illustrating the server chassis of FIG. 1.

FIGS. 1 and 2 illustrate a high-density, multiple server chassis 30, in accordance with a particular embodiment of the present invention. Server chassis 30 includes a plurality of server processing cards 32–44 coupled with a midplane 46. A plurality of network interface cards 47–51 are also coupled with midplane 46 and provide processing cards 32–44 with access to one or more attached communication networks. Server processing cards 32–44 provide the functionality of single board computers which may be employed as rack mounted servers. Server chassis 30 and midplane 46 are adapted to receive up to twenty-four server processing cards and provide access to as many as four independent networks, including the Internet. In a particular embodiment to be described later in more detail, one or more network interface cards 47–51 may include an attached single board computer "daughter card". The number of server processing cards and/or network interface cards included with server chassis 30 may vary significantly within the teachings of the present invention. For illustrative purposes, twelve server processing cards 32–43 are included in FIG. 1. An additional processing card 44 is illustrated in FIG. 2.

In accordance with a particular embodiment, one or more hardware masters are selected from server processing cards 32–44 and/or network interface cards 47–51 to at least partially monitor, control, and/or record historical operating data regarding the operation of various components of server chassis 30. The hardware master includes a module with the ability to monitor and control such components. For example, in a particular embodiment, the hardware master is a repository of health and configuration data regarding its associated server chassis components. The hardware master may also include active control features including hardware, software, and/or password resets, booting and updates. One or more server processing cards 32–44 and/or network interface cards include suitable hardware, software and/or logic for performing hardware master responsibilities. In the illustrated embodiment, passive midplane is configured to detect the presence of server processing cards and/or network interface cards and select the appropriate hardware master(s) based upon a predetermined management hierarchy.

Each server processing card 32–44 is at least partially enclosed within a box build 52. A hinged articulating door 54 is operable to enclose each server processing card 32–44 within box build 52, and provide access to server processing cards 32–44, as needed for provisioning, service, maintenance, and/or replacement.

A plurality of box fans 56–61 coupled with articulating door 54 are operable to provide airflow adjacent each server processing card 32–44, for cooling purposes. Each fan 56–61 may be configured to run at a relatively high speed if any one of processing cards 32–44 detect the need for additional airflow and/or cooling for one or more of its associated components (e.g. "high-temperature condition"). Accordingly, one or more fans 56–61 may be actuated to one of at least three operating speeds in response to the operating characteristics of one or more components of server-processing cards 32–44.

In the illustrated embodiment, a plurality of operating temperatures associated with components of each server processing card 32–44 are periodically monitored and used to determine the appropriate operating speed for box fans 56–61. The hardware master may be operable to at least partially monitor, record, store and/or control the operation of fans 56–61. Accordingly, in particular embodiments, the hardware master may monitor a plurality of temperature sensors included within server chassis 30 and actuate the fans as needed for cooling. The hardware master may also be operable to detect failure of a fan(s) and/or other components of server chassis 30.

Box build 52 includes a base 62 forming a lower portion of box build 52. In the illustrated embodiment, box build 52 and base 62 are fabricated from plated steel. Box build 52 and articulating door 54, in combination, provide the ability to protect server processing cards 32–44 from ambient environment and/or damage. When articulating door 54 is in the closed position, box fans 56–61 may be used to draw air from the ambient environment, through articulating door 54. The air is exhausted through a back plate 64 of box build 52. In a particular embodiment, each box fan 56–61 includes a tachometer output having an interface coupled with midplane 46, and the interruption of service of any particular fan may be automatically and promptly detected. The hardware master may be operable to monitor the tachometer(s) and detect such interruption of service.

Articulating door 54 includes a printed circuit board ("PCB") 66 which allows for the viewing of LED indicator lights associated with server processing cards 32–44, by an operator standing in front of articulating door 54 (opposite server processing cards 32–44). Recessed windows 68 include slightly "smoked" translucent material, such that the associated LED indicator lights are reasonably visible through articulating door 54.

In the illustrated embodiment, server chassis 30 measures approximately 17.3 inches wide by 25.5 inches deep, by 5.25 inches high. The environmental operating temperature is within the approximate range of 0° C. to 40° C. (32° F. to 104° F.). The hardware master is operable to periodically record, and/or store the environmental operating temperature. Server chassis 30 may be operated at altitudes exceeding ten thousand feet above sea level.

Midplane 46 includes two power supply mounting mechanisms 90 (see FIGS. 4A and 4B), which facilitate the installation of two load-balance, hot-swappable power supplies 92. Power supplies 92 are installed upon backplate 64 with mechanical fasteners, for example, thumbscrews. Each power supply 92 includes enough power to operate a fully populated (e.g. twenty-four server processing cards) midplane 46, in case one of the two power supplies 92 fails. Accordingly, server chassis 30 may be operated using a single power supply 92, with an optional upgrade to a second power supply. The hardware master is operable to detect the presence of the power supply(s) and determine their respective specifications/capabilities. The hardware master may also be operable to detect power supply failures and/or determine the distribution of power supplied by power supply(s) 92 according to the power available from one or both.

Power supplies 92 are considered load balanced because they include "auto sensing" capabilities. Each power supply 92 has the ability to sense the load required of it. In the illustrated embodiment, printed circuitry associated with midplane 46 evenly distributes the necessary power consumption load between power supplies 92. This distribution of power and auto-sensing may be monitored by the hardware master. In a particular embodiment, power supplies 92 will each supply approximately one-half of the necessary power (current) to midplane 46 if each power supply 92 is properly connected and fully operational. If service from one power supply 92 is diminished, or becomes unavailable, the other power supply 92 and/or the hardware master will sense this and cause the other power supply 92 to provide the power necessary for midplane 46 to operate at full capacity. In another embodiment, power supplies 92 and midplane 46 may be provided with the printed circuitry necessary to allow power supplies 92 to communicate with one another, the hardware master, and/or other components of chassis 30 regarding their load sharing responsibilities, and report trouble and/or diminished capacity to one another.

Articulating door 54 of chassis 30 includes a chassis intrusion sensor associated with printed circuit board 66. Each power supply 92 includes an integral circulation fan. When articulating door 54 is opened, a circuit is closed which forces the circulation fan(s) to a HIGH setting. Each power supply 92 includes an associated interface which allows this wiring configuration. This is done to compensate for the loss of airflow from fans 56–61 due to articulating door 54 being opened. In this manner, additional airflow through power supplies 92 at least partially compensates for the loss of airflow through fans 56–61, and additional airflow is drawn across each server processing cards. When articulating door 54 is closed, the fans associated with power supplies 92, return to their previous setting. In a particular embodiment, the hardware master may be operable to monitor the intrusion alarm and/or control the fans associated with the power supplies as described above.

Figure 3:
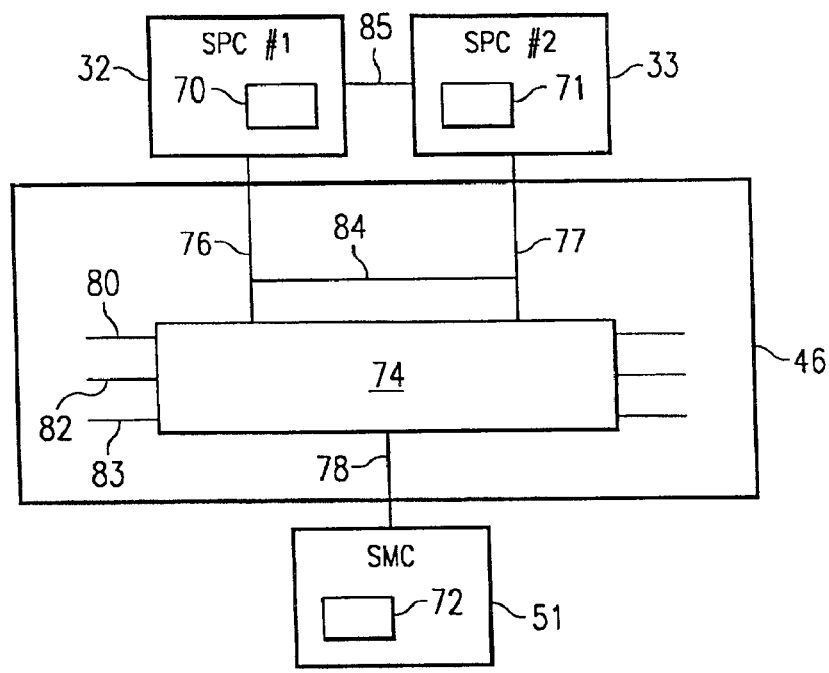
FIG. 3 is a partial wiring and control diagram, with portions broken away, illustrating a midplane coupled with a network interface card and a plurality of server processing cards, in accordance with a particular embodiment of the present invention.

FIG. 3 is a schematic drawing, with portions broken away, illustrating two server processing cards 32 and 33, midplane 46, and network interface card 51. Each server processing card 32 and 33 includes a master control module 70 and 71, respectively. Network interface card includes a control module 72. Each of control modules 70–72 include hardware, software and/or logic for performing hardware master responsibilities. However, in a particular embodiment of the present invention, only one of control modules 70–72 is selected to perform the hardware master responsibilities at any given time. The selected control module may be referred to as the master control module. In an alternative embodiment, one or more control modules 70–72 may share hardware master responsibilities. The control module may be selected according to a predetermined hierarchy, which depends upon the hardware configuration of server chassis 30 at any given time.

Midplane 46 includes a master signal control module 74. Server processing cards 32 and 33 are coupled with master signal control module 74 using communication links 76 and 77, respectively. Network interface card 51 is coupled with master signal control module 74 using communication link 78. Master signal control module 74 includes hardware, software and/or logic to determine which control module of 70–72 will assume hardware master responsibilities, and master signal control module 74 distributes master control signals over one of communication links 76–78 accordingly.

Master signal control module 74 includes the ability to detect which hardware components are coupled with midplane 46. A predetermined hierarchy of hardware masters is included with master control module 74 to allow master control module to select the appropriate hardware master. Therefore, at any given instance, for example at system startup, master signal control module 74 determines which hardware component should assume hardware master responsibilities. In the illustrated embodiment, the priority for hardware master is selected according to the following hierarchy: (i) network interface card 51; (ii) server processing card 32; and (iii) server processing card 33. This particular hierarchy is determined according to which connector 45 a particular server processing card is coupled with.

If network interface card 51 is coupled with midplane 46, then network interface card 51 assumes hardware master responsibilities. If master control module 46 determines that network interface card 51 is not present, then hardware master responsibilities are delegated to server processing card 32. Similarly, if neither network interface card 51 nor server processing card 32 are present, then hardware master responsibilities are delegated to server processing card 33. The particular hierarchy, or priority for hardware master may be modified within the teachings of the present invention, to suit any hardware configuration and/or hierarchy scheme.

In accordance with a particular embodiment of the present invention, each control module 70–72 includes a respective master signal input to monitor its respective communication link 76–78 with master control module 74 to determine if master control signals are being received. If any particular control module of 70–72 determines that master control signals are not being received from master signal control module 74, then that particular control module of 70–72 remains idle. If master control signals are being received, then whichever control module of 70–72 is receiving the master control signal executes and/or becomes active in order to assume hardware master responsibilities.

In the illustrated embodiment, since each of network interface card 51, and server processing cards 32 and 33 are present, master signal control module 74 will appoint control module 72 (if present) as hardware master, and deliver master control signals to control module 72. Control module 72 detects the presence of master control signals on communication link 78, and control module 72 executes and assumes hardware master responsibilities. Since master control signals are not being transmitted over communication links 76 and 77, neither of control modules 70 or 71 will detect master control signals. Therefore, in this embodiment, control modules 70 and 71 will remain idle and server processing cards 32 and 33 will operate subject to the control of the hardware master, namely, network interface card 51. Server processing cards 32 and 33 will also report various configuration and health information to control module 72 to allow control module 72 to conduct its hardware master responsibilities.

The hardware master is responsible for control of various hardware components of server chassis 30. Furthermore, the hardware master monitors, collects and stores health and configuration data regarding various components of server chassis 30. The hardware master also transmits some or all of this information to other components of server chassis 30 and/or an attached network upon request, or according to a predetermined reporting scheme.

Health data regarding various components of server chassis 30 may include such information as the operating temperature of any given component and/or temperature sensor, voltage, fan speeds, disk drive health or performance, and/or power supply activity. Therefore, the hardware master can determine failures of particular components, and/or impending failure of particular components.

Configuration data regarding server chassis 30 includes information including which components are present, the hardware and/or software resident on a given component, unique identifiers regarding the components, capacities, remaining capacities and/or capabilities. For example, in the illustrated embodiment, each server processing card 32–44 may include one or more different operating systems. The hardware master can determine which operating system(s) are present upon each particular server processing card 32–44. The hardware master also determines which of server processing cards 32–44 are coupled with midplane 46 and which of connectors 45 of midplane 46 are vacant. Similarly, the hardware master determines which of network interface cards 47–51 are coupled with midplane 46, and which network interface card connectors are vacant. The hardware master also determines which power supplies are coupled with midplane 46, and which power supply mounting mechanism(s) is vacant.

If a given server processing card 32–44 is coupled with midplane 46, the hardware master can establish which hardware components are included with the particular server processing card. Such information includes the size of the disk drive(s) attached to the server processing card, capacity, remaining capacity, speed, and unique identification number. The hardware master also can establish the specification of the central processing unit attached to the server processing card. In fact, the hardware master includes the ability to detect all hardware components associated with the server processing card and their respective specifications, capabilities, capacities and unused capacities of each component.

In a particular embodiment of the present invention, master signal control module 74 includes a plurality of diodes and resistors which accomplish the logic necessary to determine the identity of the hardware master and distribute master control signals accordingly. In this particular embodiment, master signal control module 74 does not include other hardware components such as integrated circuits.

Each server processing card 32 and 33 also includes all of the components, features, and functionality of all server processing cards described herein. Therefore, if master control signals are not being received at either of server processing cards 32 and/or 33, then they continue to function as server processing cards subject to the control of the hardware master. In fact, even when a particular server processing card is functioning as hardware master, that particular server processing card continues to function as a server processing card and continues to include the features and functionality of a standard (e.g. non hardware master) server processing card using available resources which are not dedicated to performing hardware master responsibilities.

In a particular embodiment of the present invention, midplane 46 includes a command bus 80, a control bus 82, and $I^2c$ bus 83. Each of command bus 80, control bus 82, and $I^2c$ bus 83 may be used to communicate signals with each component which is coupled with midplane 46. More specifically, in accordance with a particular embodiment, each of command bus 80, control bus 82, and $I^2c$ bus 83 may be coupled with each server processing card 32–44.

The hardware master selected from network interface card 51 and server processing cards 32 and 33 controls components of server chassis 30 using command bus 80, control bus 82, and/or $I^2c$ bus 83. In a particular embodiment, command bus 80 includes an RS-485 bus. The hardware master includes the ability to perform remote resets (e.g., reboot) of any particular server processing card using the control bus 82.

In accordance with a particular embodiment, the hardware master may cause any particular server processing card to reboot from an attached hardware component of a network coupled with server chassis 30 through one of network interface cards 47–51. Control bus 82 may also be used to detect the presence of a server processing card in any of connectors 45.

In a particular embodiment, server processing cards 32 and 33 may share hardware master responsibilities. For example, server processing cards 32 and 33 may be configured to assume active and standby roles with respect to hardware master responsibilities. A communication link 84 may be provided between communication links 76 and 77 for this embodiment. When communication link 84 is present, each of server processing cards 32 and 33 will receive control signals from master signal control module 74, if network interface card 51 is not present. Control modules 70 and 71 may be configured to determine which control module will assume hardware master responsibilities. Accordingly, a communication link 85 is provided between server processing cards 32 and 33. Communication link 85 allows control modules 70 and 71 to communicate regarding their shared hardware master responsibilities.

FIGS. 4A and 4B illustrate components of midplane 46. On its front face 100, midplane 46 includes a plurality of server processing card connectors 45 which facilitate the installation of up to twenty-four server processing cards 32. In a particular embodiment, server processing card guides are installed at 0.7 inch center to center dimensions. Alternatively, up to twelve server processing cards 32 including optional three and one-half inch disk drives may be installed upon midplane 46, using every other connector 45.

Rear face 102 of midplane 46 includes a pair of power supply mounting mechanisms 90 which accommodate the coupling of power supplies 92 with midplane 46. Rear face 102 of midplane 46 also includes a plurality of network interface card connectors 104–109. Midplane 46 of server chassis 30 includes all of the power and connectivity requirements to accommodate up to twenty-four server processing cards.

In a particular embodiment, midplane 46 of the illustrated embodiment is considered "passive" because it includes no active components (e.g., powered integrated circuits) which can fail. Instead, midplane 46 includes the necessary wiring to connect each respective server processing card 32 with its corresponding network interface card. Midplane 46 includes the appropriate printed circuitry to distribute data and power necessary for the operation of server chassis 30. The distribution of data and power is monitored and/or controlled, at least in part, by the hardware master. For example, midplane 46 distributes power to components of server processing cards 32, network interface cards 104–109, and/or PCB 66. Additionally, midplane 46 distributes data and/or communications signals between server processing cards 32, network interface cards 104–109 and/or PCB 66.

Midplane 46 also includes a ribbon cable connector 134 which couples PCB 66 with midplane 46. Connector 134 and the hardware master are operable to distribute power and communicate control signals between midplane 46 and PCB 66 of chassis 30. This accommodates the operation of the PCB 66, fans 56–61 and LEDs associated with articulating door 54.

Figure 5:
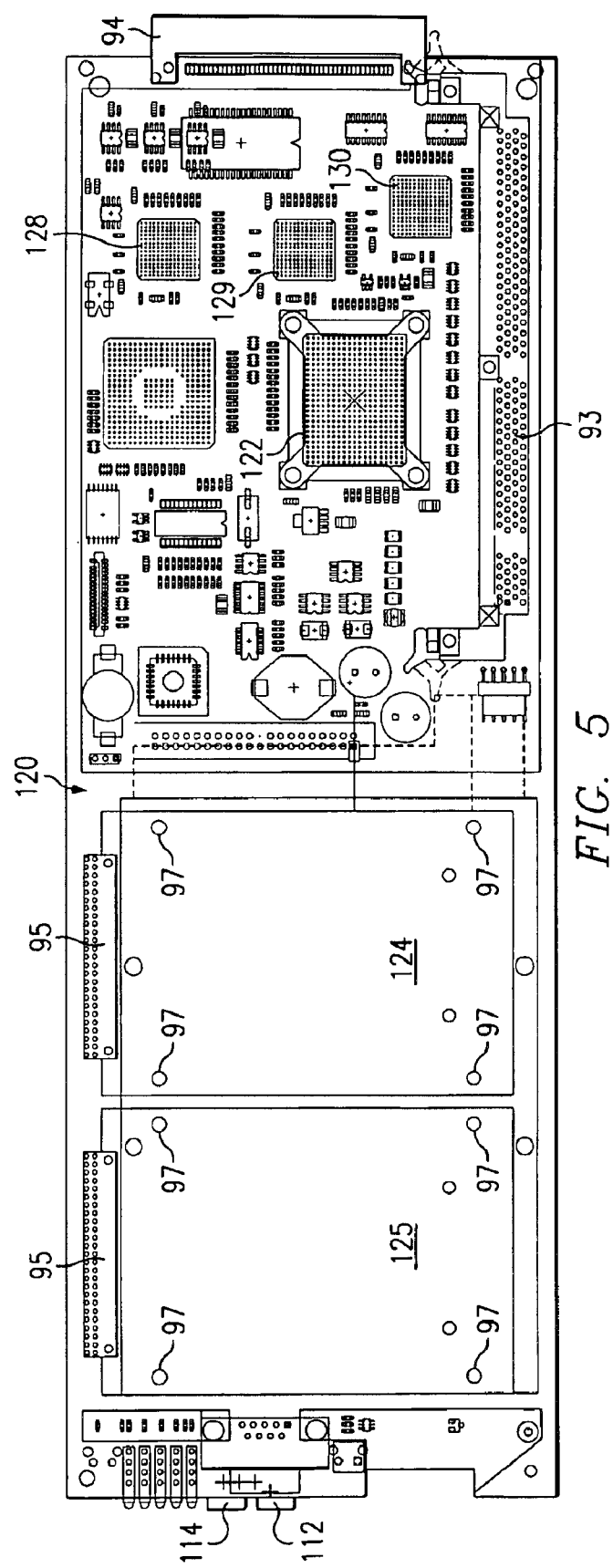
FIG. 5 is a schematic drawing, with portions broken away, illustrating a server processing card of the server chassis of FIG. 1, in accordance with a particular embodiment of the present invention.

FIG. 5 is a schematic drawing, with portions broken away, illustrating server processing card 32 in accordance with a particular embodiment of the present invention. Server processing card 32 is a single board computer upon which components and devices are mounted to enable processing card 32 to function and operate as a server hosting a wide array of Internet-based applications. Each server processing card 32 within a particular chassis 30, shares a common midplane 46 through which power and connectivity passes. Server chassis 30 is intended for rack mount in server rack 150 (See FIG. 7), and includes midplane 46 and all the associated server processing cards 32.

In one embodiment, server processing card 32 includes a powerful computer connected to the Internet and operable to store audio, video, data graphics and/or text files in order to display to a user of a public network via protocols including, without limitation, hypertext transfer protocol (HTTP). Each server processing card 32 includes a printed circuit board 120, coupled with a central processing unit (CPU) 122, a disk drive 124, a dynamic memory integrated circuit 93, and network interface integrated circuitry 128–130.

Central processing unit 122 performs the logic, computational and decision making functions of processing card 32. Many types of central processing units with various specifications may be used within the teachings of the present invention. In the illustrated embodiment, CPU 122 includes a Crusoe™ 5600, 633 MHz CPU, as manufactured by Transmeta. In fact, many central processing units with comparable processing power to a Pentium III, as manufactured by Intel, may be used within the teachings of the present invention. For example, the Crusoe™ 5800 may also be used.

CPU 122 of the present invention may include the ability to adapt its processing speed to the processing load placed upon it. In other words, CPU 122 may vary its speed as appropriate to handle any given processing load, whereas many other processors simply include ON or OFF capabilities. The CPU 122 of the present invention may include a maximum continuous power consumption of no more than five watts, and a maximum operating temperature of below 150 degrees Fahrenheit.

In the illustrated embodiment, the maximum operating temperature of CPU 122 is approximately 120° Fahrenheit. Due to its variable speed feature CPU 122 of the present invention will typically consume significantly less than five watts of power. CPU 122 of the illustrated embodiment is compatible with the Intel instruction set such that CPU 122 supports standard X86 operating system.

Disk drive 124 includes electronics, motors, and other devices operable to store (write) and retrieve (read) data on disk media. In the illustrated embodiment, disk drive 124 includes a two and one-half inch IBM 9.5 mm notebook hard drive. A second two and one-half inch disk drive 125 may be installed upon a given server processing card 32. The use of disk drive 125 is optional, and increases the capacity and functionality of server processing card 32, and allows for drive data redundancy.

A plurality of hardware connectors are provided upon printed circuit board 120, to allow for the installation of up to two, two and one-half inch disk drives. For example, communication ports 95 are affixed to printed circuit board 120, to allow for the installation of disk drives 124 and/or 125. Each disk drive 124 and 125 is also affixed to printed circuit board 120, using connectors 97.

The use of server processing card 32 having two, two and one-half inch disk drives allows for the installation of three hundred and thirty-six servers within an industry standard rack having 42U of usable interior space (standard industry rack). For purposes of this specification, a standard industry rack has the approximate dimensions of nineteen inches wide by six feet high by thirty to thirty-four inches deep.

Furthermore, at least two, 5 to 30 gigabyte—two and one-half inch hard drives may be provided with server processing card 32, in accordance with the teachings of the present invention. Alternatively, a 10 to 75 gigabyte, three and one-half inch hard drive may be installed upon server processing card 32, in lieu of two and one-half inch drives 124 and 125. Many other hard drives are suitable for use within the teachings of the present invention. In fact, many hard drives having a maximum operating temperature of 125° F. and a maximum continuous power output of 2.5 watts may be substituted for disk drive 124 of the present invention. Accordingly, a plurality of configurations for server processing cards 32 are envisioned within the teachings of the present invention.

In another embodiment, each server processing card 32 is equipped with a single, three and one-half inch disk drive, which offers greater spindle speed and product life. Alternatively, two and one-half inch disk drives provide greater density and lower power requirements. In a particular embodiment, the three and one-half inch disk drive may include an IBM DeskStar or the two and one-half inch disk drives may include an IBM TravelStar hard drive. A total of one hundred and sixty-eight server processing cards having a three and one-half inch disk drive may be mounted in a standard industry rack.

Server processing card 32 also includes a dynamic memory integrated circuit, or memory 93. Memory 93 includes a dual in-line memory module ("DIMM"), to provide the appropriate speed and bandwidth for network communication. In a particular embodiment, memory 93 includes a standard one hundred and sixty-eight pin connector. The storage capacity of memory 93 may be approximately 64 MB RAM, or greater.

Three interface integrated circuit chip sets 128, 129 and 130 are coupled with printed circuit board 120. Chip set 128 may be referred to as public network interface integrated circuit since it corresponds with the operation of the public network. Similarly, chip set 129 may be referred to as the private network interface integrated circuit and chip set 130 may be referred to as the management network interface integrated circuit since they correspond to private network and management network operations, respectively. Collectively, chip sets 128, 129 and 130 may be configured to provide three 10/100/1000 megabits per second Ethernet network interfaces. Additional chip sets may be included with server processing card 32 in order to support more than three independent networks. Chip sets 128–130 may be used for communication between server processing cards 32 and network interface cards 47–51.

Each chip set 128, 129 and 130 also includes "boot from LAN" capability. Boot from LAN refers to the ability of server processing card 32 to reboot from an attached network device, rather than rebooting from hardware and/or software integrated to server processing card 32. This may be used to provide software updates, new and/or revised versions and/or troubleshooting. In a particular embodiment of the present invention, any of server processing cards 32–44 may receive a command to boot from LAN. This command may be generated by the hardware master of a given session. When this command is received, the next time server processing card 32 reboots, it will do so from an attached network component. The server processing card will continue to boot from LAN until it receives a command to boot from disk.

A high density, 80 pin SCA connector 94 is used to couple server processing card 32 with a corresponding high density, 80 pin SCA connector 45 associated with midplane 46. Connector 94 includes a "blind mate" feature which provides self-alignment properties for simplified installation and removal of processing card 32 from passive midplane 46. Connector 94 also includes pins suitable for hot swap insertion and extraction of server processing cards 32–144 Connectors 94 and 45 also include built-in serial connectors for managing network traffic. In other words, connectors 94 and 45 are appropriately sized and configured to accommodate a serial connection independent of the above referenced Ethernet connections and any other required power/communications ports.

Server reset button 112 of server processing card 32 may be used to accomplish a "hard" local reset of the associated processing card 32. A password reset button 114 is also provided and may be used to locally reset the administrative password. In other words, password reset button 114 may be used to erase the existing administrative password such that an operator of network 30 may redefine the administrative password. The hardware master may be used to monitor the use of resets 112 and/or 114.

A dual in-line memory module (DIMM) connector 93 is also provided upon server processing card 32. In the illustrated embodiment, DIMM connector 93 includes a multiple pin connector. The size and configuration of DIMM connector 93 may be significantly altered, within the teaching of the present invention. DIMM connector 93 facilitates the installation of a dual in-line memory module(s) DIMM(s). Accordingly, server processing card 32 can accommodate significantly more bandwidth than traditional systems which incorporate a single in-line memory module (SIMM). The hardware master may be used to detect the presence, specifications, and/or capacities associated with the attached DIMM.

Server processing card 32 also includes a custom Basic Input/Output System ("BIOS") which contains the appropriate instructions for system initialization. The BIOS of the illustrated embodiment is capable of supporting communication with at least three independent networks. The BIOS is also configured to support the "Boot from LAN" capability described above. Many of the other components of server processing card 32 are similar in structure and function to a typical motherboard, although support for video, keyboard and a mouse may be removed. Each server processing card 32 may include two megabytes of flash read-only-memory (ROM) for BIOS storage.

As previously described, each server processing card may have either a three and one-half inch disk drive installed, a two and one-half disk drive, or two, two and one-half inch disk drives installed. Standard three and one-half inch disk drives use primarily 12 volt power and standard two and one-half inch disk drives use 5 volt power. Accordingly, 5 and 12 volt loading by each server processing card may be very different depending on the type and/or size of disk drives installed. In previous web servers, the variation in loading between the 5 and 12 volt supplies would have required the use of different power supplies depending on the type of disk drives installed, or the use of much larger power supplies to compensate for the wide variation in 5 and 12 volt loading.

Server processing cards 32 eliminate these problems by balancing to some degree the loading on the 5 and 12 volt supplies as follows:

The input power to a CPU DC to DC converter, installed upon server processing card 32, is 12 volts when a two and one-half inch disk drive is installed.

The input power to the CPU DC to DC converter is 5 volts when a three and one-half inch disk drive is installed.

The input power for the CPU DC to DC converter is controlled by a disk drive power cable and is automatically configured when the appropriate cable is installed.

Accordingly, server processing card 32 includes the ability to detect which type/size of disk drive is installed, and change the voltage provided to the DC to DC converter, based upon the disk drive(s) present.

This technique ensures that the power source for the CPU DC to DC converter will be properly configured because the assembly process of disk drive installation causes the DC to DC converter power source to be configured properly and no additional configuration steps are required.

In a particular embodiment, the hardware master may be operable to monitor the distribution of power, in accordance with the above description. Additionally, the hardware master will be aware of the power supplies present, the specifications associated with the power supply(s), the amount of power output each power supply is contributing at a given point in time, and any power supply failures. The hardware master is also operable to detect the presence of each hard drive(s) present, and the specifications associated with the particular disk drive(s).

Figures 6A, 6B:
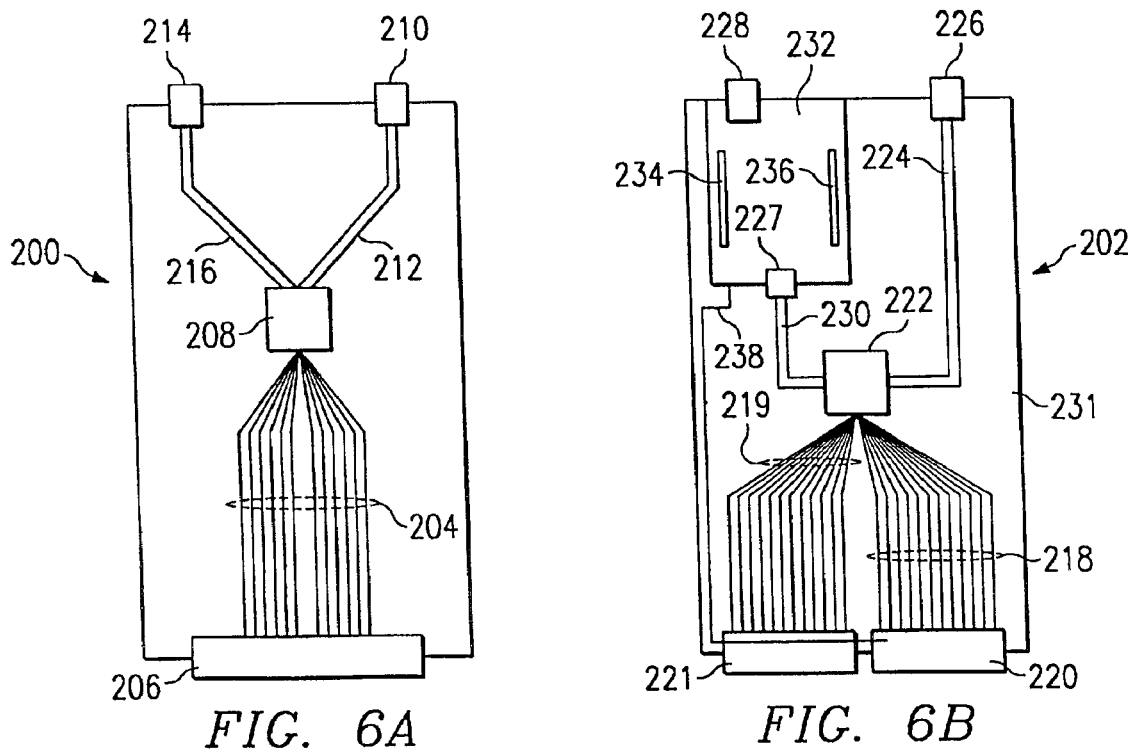
FIG. 6A is a schematic drawing, with portions broken away, illustrating a network interface card in accordance with a particular embodiment of the present invention.
FIG. 6B is a schematic drawing, with portions broken away, illustrating a network interface card in accordance with an alternative embodiment of the present invention.

FIGS. 6A and 6B illustrate network interface cards 200 and 202, in accordance with a particular embodiment of the present invention. Network interface card 200 of the illustrated embodiment is configured to support up to twelve independent server processing cards 32. Network interface card 200 includes twelve independent Ethernet communication paths 204 between a front connector 206 and a hub chip 208.

Hub chip 208 consolidates management network traffic from corresponding server processing cards 32, for distribution to an attached network. In a particular embodiment, hub chip 208 may include an integrated network hub, for example a 24-port repeater chip integrated upon interface card 200 for aggregating all management communications through a single 10/100/1000 megabits per second Ethernet connection. Hub chip 208 may be referred to as a repeater because it broadcasts, or repeats, every message it receives to all ports of the management network. In another embodiment, hub chip 208 may be replaced with a switch chip which provides the ability to address and distribute messages according to a packet header, to the appropriate port within a management network. The hub chip may be employed, in lieu of a switch chip, at network interface card 200 due to the reduced cost and simplified operation. In one embodiment, RJ-45 connectors 210 and 214 may include connectors suitable for gigabit ethernet. In another embodiment, connectors 210 and/or 214 may be replaced with fiber optic or copper gigabit interface connectors ("GBIC").

Connector 206 includes an 80-pin SCA connector, which couples network interface card 200 with midplane 46. Each Ethernet communication path 204 associated with network interface card 200 terminates at hub switch chip 208. Hub chip 208 monitors and distributes traffic from a respective server processing card 32 to a corresponding RJ-45 Ethernet connector 210, through an Ethernet communication link 212. In a particular embodiment, a switch chip may be used in lieu of hub chip 208. The switch chip may include an optional twelve or twenty-four port 10/100 Base T switch with fiber gigabit uplinks. In another embodiment, the switch chip may include an optional twelve or twenty-four port 10/100 Base T switch with copper gigabit uplinks.

A redundant configuration may also be included having a second RJ-45 connector 214 and Ethernet communication link 216. This provides the network operator with the ability to include redundant communication links to networks in separate physical locations, for emergency and/or backup operation in the event of a failure of one of the network systems.

Network interface card 200 provides modular connectivity to server chassis 30, such that an operator of server chassis 30 may access rear connectors 210 and 214 at a convenient location upon server chassis 30. In an alternative embodiment, a standard RJ-21 connector may be used in lieu of Ethernet connector 210 and/or RJ-45 connector 214 in order to distribute data between network interface card 200, and corresponding server processing cards 32, and an attached network. Accordingly, a communication link having twelve groups of two twisted pair category five cables, for a total of twelve different Ethernet connections, or forty-eight wires total, may be coupled with connector 210. The connection between the external network and network interface card 200 may be accomplished with high density Ethernet connectors. In another embodiment, integrated 10/100/1000 switches may be incorporated using octopus cables which "fan-out" from a high density connector to multiple RJ-45 connectors.

FIG. 6B illustrates network interface card 202. Network interface card 202 includes a single board computer 232, coupled with a printed circuit board 231 of network interface card 202. Single board computer 232 may also be referred to as a "daughter card" to network interface card 202. Single board computer 232 includes similar hardware, software, and/or components to server processing cards 32, except single board computer 232 does not include a disk drive, in the illustrated embodiment. Network interface card 202 includes a pair of high density connectors 220 and 221. High density connectors 220 and 221 collectively include at least twelve Ethernet connectors, a command bus, control bus, $I^2c$ bus, identical status and control lines to those coupled with each server processing card, and a power interface.

The power interface associated with each high density connector 220 and 221 is configured to provide 3.3 or 5.0 volt power source to network interface card 202. Accordingly, power may be distributed to various components of network interface card 202, including single board computer 232, and hub chip 222.

The twelve Ethernet connectors 218 and 219 associated with high density connectors 220 and 221, respectively, enable each high density connector 220 and 221 to interface with at least 12 server processing cards 32. Accordingly, in the illustrated embodiment, each network interface card 202 can collect, interpret and manage communications and data transfer with at least 24 server processing cards 32.

Twelve Ethernet connections 218 are used to couple high density connector 220 with hub chip 222. Similarly, twelve Ethernet connections 219 are used to couple high density connector 221 with hub chip 222. Hub chip 222 consolidates management network traffic from up to twenty-four server processing cards 32, for distribution to single board computer 232 and/or an attached network. In another embodiment, a switch chip may be used in lieu of hub chip 222 in order to provide network interface card 202 with the ability to selectively switch and distribute network management information rather than simply broadcasting all messages received to every node coupled with network interface card 202.

A communication link 224 distributes data between hub chip 222 and an Ethernet connector 226. Accordingly, Ethernet connector 226 may be coupled with an attached management network. In a particular embodiment, network interface card 202 may be provided without single board computer 232.

In another embodiment, single board computer 232 may be provided with network interface card 202, or network interface card 202 may be "upgraded" in the future to include single board computer 232. Accordingly, connectors 234 and 236 are typically provided upon network interface card 202, to facilitate the installation of single board computer 232.

A communication link 230 couples hub chip 222 with an Ethernet connector 227 associated with single board computer 232. Accordingly, when properly installed, single board computer 232 receives all broadcast signals which are received by hub chip 222. Single board computer 232 collects, stores, calculates, analyzes and communicates this information to the attached management network and/or other components of attached networks. Communication between single board computer 232 and the attached management network occurs via Ethernet connector 228.

When single board computer 232 and its associated Ethernet connector 228 are present upon network interface card 202, Ethernet connector 226 is no longer required to communicate with the attached management network 70. However, in the event of a failure of single board computer 232 and/or its associated components, including without limitation Ethernet connector 228, Ethernet connector 226 provides an alternative path of communication between network interface card 202 and the attached management network. In an alternative embodiment, Ethernet connector 226 may be omitted from network interface card 202.

In the illustrated embodiment, another communications link 238 is provided in order to couple single board computer 232 and high density connectors 220 and 221. Communication link 238 may include an $I^2C$ bus, a command bus, control bus, and identical status and control lines to those coupled with each server processing card coupled with the serial port associated with high density connectors 220 and 221. As will be described later in more detail, the control bus connection between single board computer 232 and high density connector 221 allows single board computer 232 to execute a hardware reset, software reset, or password reset upon any particular server processing card with which high density connector 221 is coupled. In a particular embodiment, communication link 238 is used to couple computer 232 with command bus 80, control bus 82, and $I^2c$ bus 83.

Network interface card 202 includes the ability to perform a hardware reset of any particular server processing card 32 within chassis 30. In a particular embodiment, single board computer 232 collects telemetry data regarding the use, performance and operation of many components of server processing card 32 and/or other components of chassis 30, which will be described later in more detail. Such data may be stored within single board computer 232 and/or forwarded to the attached management network, for further processing.

Figure 7:
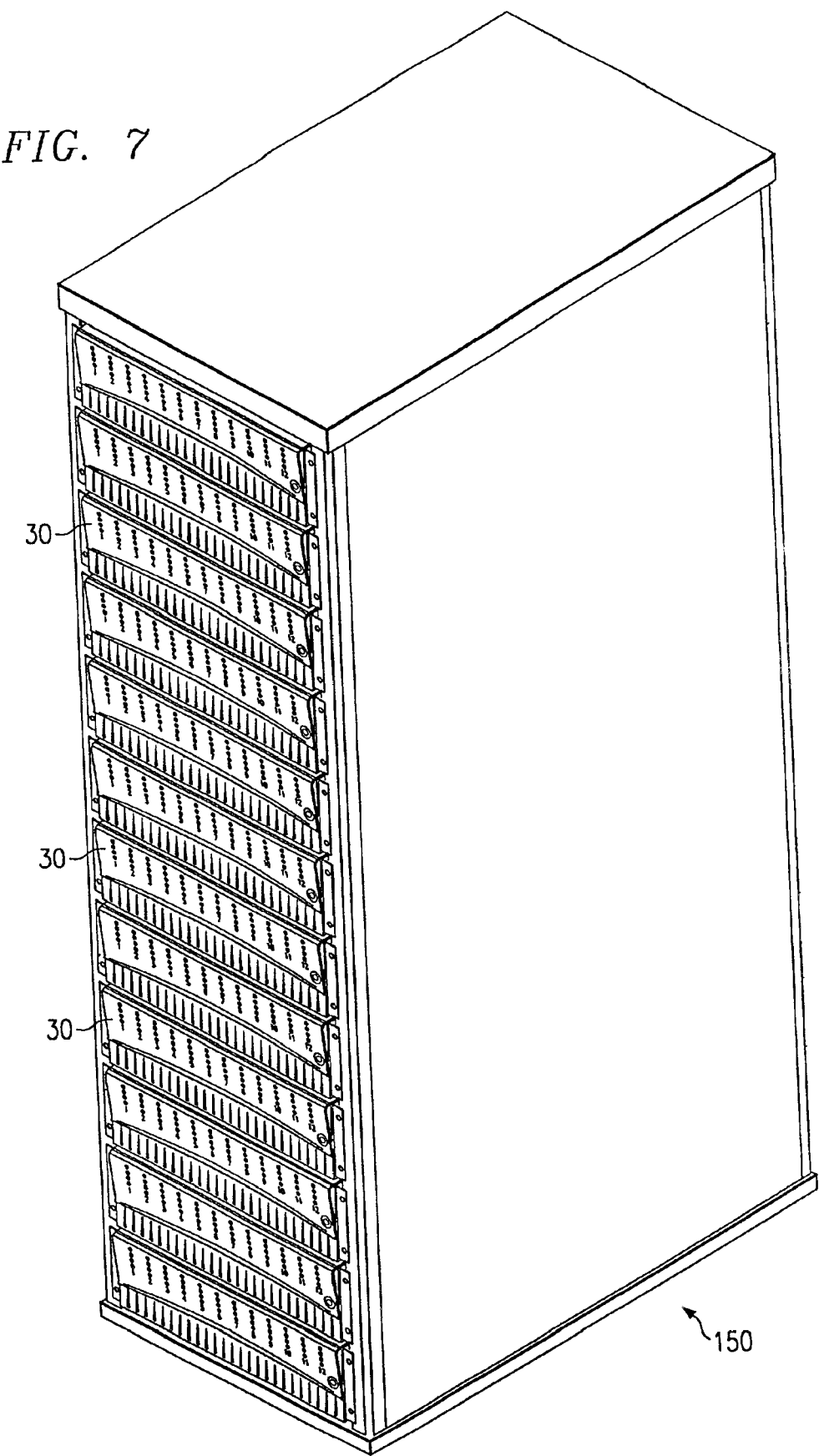
FIG. 7 is an isometric view, illustrating a server rack having a plurality of server chassis, in accordance with a particular embodiment of the present invention.

FIG. 7 illustrates a server rack 150 including a plurality of server chassis 30. In a particular embodiment, each server chassis 30 consumes a total of 3U (1U=1.75 inches) of space. Accordingly, as many as fourteen server chassis 30 may be installed in an industry standard 42U rack. Each chassis 30 comes equipped with the ability to support redundant, load-balanced power supplies and RJ-21 style connectors which allow the consolidation of the requisite Ethernet cables to a significantly smaller number of cables than those required through the use of conventional RJ-45, connectors.

Figure 8:
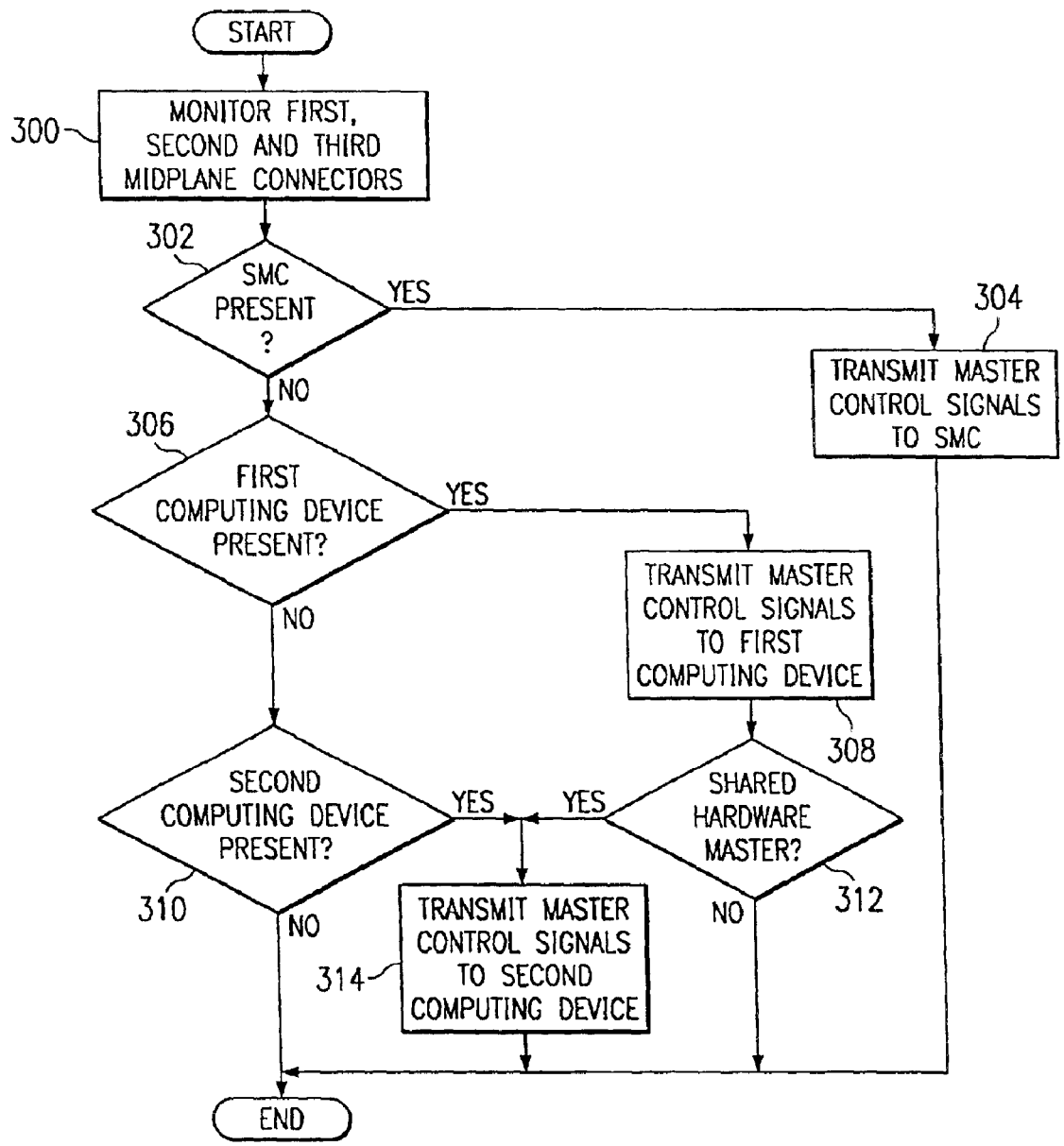
FIG. 8 is a flow diagram illustrating a method for selecting a hardware master and distributing control signals, in accordance with a particular embodiment of the present invention.

FIG. 8 is a flow diagram illustrating a method for selecting a hardware master and distributing control signals, in accordance with a particular embodiment of the present invention. The method begins at step 300 where three midplane connectors are monitored, in order to detect the presence of hardware components. In the illustrated embodiment, the master signal control module monitors the connectors. The master signal control module includes hardware, software and/or encoded logic operable to select the hardware master. Although the master signal control module is resident upon midplane 46, it will be recognized by those of ordinary skill in the art that the hardware, software and/or logic may be distributed amongst various components of server chassis 30.

Next, at step 302, the master signal control module determines if the System Management Controller ("SMC") is present. The SMC of the present invention refers to a network interface card including a daughter board computer similar to network interface card 202. In the illustrated embodiment, the SMC receives priority for hardware master responsibility and assumes the role of hardware master whenever it is present. Therefore, if the SMC is present, the master control signals are transmitted to the SMC at step 304.

If the SMC is not present, the master signal control module determines if the first computing device is present, at step 306. In the illustrated embodiment, the first computing device corresponds to server processing card 32. If the first computing device is not present, the master signal control module determines whether the second computing device is present, at step 310. The second computing device corresponds with server processing card 33. If the second computing device is not present, then the method ends. If the second computing device is present, and the SMC and first computing device are not present, then the master control signals are distributed to the second computing device at step 314.

If the first computing device is present and the SMC is not, master control signals are transmitted to the first computing device at step 308. Furthermore, the system determines whether the first computing device, second computing device, and/or midplane are configured for a shared hardware master at step 312. If they are not configured for a shared hardware master, then the method ends. If they are configured for a shared hardware master, and the second computing device is present, then the control signals are also transmitted to the second computing device at step 314.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A server processing card, comprising:
   a printed circuit board;
   a central processing unit coupled with the printed circuit board;
   memory integrated circuits coupled with the printed circuit board;
   network interface integrated circuitry coupled with the printed circuit board; and
   a master control module coupled with the central processing unit, the master control module being operable to monitor a master signal input in order to detect the presence of a master control signal being communicated to the server processing card; and
   wherein the master control module remains idle if the master control signal is not detected.

2. The server processing card of claim 1, wherein the master control module becomes active if the master control signal is detected.

3. The server processing card of claim 2, wherein the active master control module performs hardware master responsibilities with regard to a plurality of computing devices coupled with the server processing card within a server chassis.

4. The server processing card of claim 3, wherein the active master control module monitors health information regarding hardware components coupled with the server processing card within the server chassis, the hardware components including the plurality of computing devices.

5. The server processing card of claim 4, wherein the health information regarding the hardware components is selected from the group consisting of operating temperature, operating voltages, operating fan speed, and operating disk drive health and configuration.

6. The server processing card of claim 3, wherein the active master control module monitors configuration information regarding hardware components coupled with the server processing card, the hardware components including the plurality of computing devices.

7. The server processing card of claim 6, wherein the configuration information is selected from the group consisting of size of a disk drive, speed of a processor, unique identification numbers associated with the hardware components, memory capacity of memory integrated circuits and operating capacity of power supplies.

8. The server processing card of claim 3, wherein the active master control module monitors information regarding hardware components coupled with the server chassis, the information being selected from the group consisting of health information and configuration information.

9. The server processing card of claim 8, wherein the hardware components are selected from the group consisting of power supplies, disk drives, memory integrated circuits, and cooling fans.

10. The server processing card of claim 3, wherein the active master control module includes the ability to reboot at least one of the computing devices.

11. The server processing card of claim 3, wherein the active master control module includes the ability to cause at least one of the computing devices to boot up from an operating system resident upon a remote component of a local area network.

12. The server processing card of claim 3, wherein the network interface integrated circuitry is coupled with a local area network, and the active master control module is configured to report health and configuration data regarding at least one of the computing devices to a remote component of the local area network.

13. The server processing card of claim 2, further comprising a communication coupling configured to receive a control bus and wherein the active master control module is operable to control hardware components coupled with the server processing card within a server chassis using the control bus.

14. A server chassis, comprising:
   a plurality of server processing cards each having a respective master control module;
   each master control module being operable to monitor an associated master signal input to detect a master control signal, and remain idle if the master control signal is not detected;
   a midplane forming a communication coupling for communication among the plurality of server processing cards; and
   wherein at least one of the plurality of server processing cards performs hardware master responsibilities with regard to at least a subset of the server processing cards.

15. A method for monitoring a plurality of server processing cards of a server chassis, comprising:
- selecting at least one hardware master from among a plurality of server processing cards:
- transmitting a hardware master control signal to the hardware master;
- activating a master control module coupled with the hardware master in response to receiving the master control signal; and
- monitoring operating information regarding at least a subset of the plurality of server processing cards, from the hardware master.

16. The method of claim 15, wherein the information is selected from the group consisting of health information and configuration information regarding the operation of the subset of the plurality of server processing cards.

17. The method of claim 15, further comprising at least partially controlling the operation of the subset of the plurality of server processing cards, from the hardware master.

18. The method of claim 15, further comprising transmitting, from the hardware master, a command to at least one of the subset of the plurality of server processing cards, the command being operable to cause the at least one of the subset to reboot.

19. The method of claim 15, further comprising transmitting, from the hardware master, a command to at least one of the subset of the plurality of server processing cards, the command being operable to cause the at least one of the subset to reboot from an operating system resident upon a remote module of a local area network coupled with the plurality of server processing cards.

20. A computer readable medium encoded with logic operable to:
- select at least one hardware master from among a plurality of server processing cards coupled with a server chassis;
- transmit a hardware master control signal to the hardware master;
- activate a master control module coupled with the hardware master in response to receiving the master control signal; and
- monitor operating information regarding at least a subset of the plurality of server processing cards, from the hardware master.

21. The computer readable medium of claim 20, wherein the logic is further operable to at least partially control the operation of the subset of the plurality of server processing cards, from the hardware master.

22. The computer readable medium of claim 20, wherein the logic is further operable to transmit, from the hardware master, a command to at least one of the subset of the plurality of server processing cards, the command being operable to cause the at least one of the subset to reboot.

23. The computer readable medium of claim 20, wherein the logic is further operable to transmit, from the hardware master, a command to at least one of the subset of the plurality of server processing cards, the command being operable to cause the at least one of the subset to reboot from an operating system resident upon a remote module of a local area network coupled with the plurality of server processing cards.

24. A system, comprising:
- means for selecting at least one hardware master from among a plurality of server processing cards coupled with a server chassis;
- means for transmitting a hardware master control signal to the hardware master;
- means for activating a master control module coupled with the hardware master in response to receiving the master control signal; and
- means for monitoring operating information regarding at least a subset of the plurality of server processing cards, from the hardware master.

25. The system of claim 24, further comprising means for at least partially monitoring the operation of the subset of the plurality of server processing cards, from the hardware master.

26. The method of claim 24, further comprising means for transmitting, from the hardware master, a command to at least one of the subset of the plurality of server processing cards, the command being operable to cause the at least one of the subset to reboot.

27. The system of claim 24, further comprising means for transmitting, from the hardware master, a command to at least one of the subset of the plurality of server processing cards, the command being operable to cause the at least one of the subset to reboot from an operating system resident upon a remote module of a local area network coupled with the plurality of server processing cards.

* * * * *